United States Patent [19]

Crayne et al.

[11] Patent Number: 5,290,093
[45] Date of Patent: Mar. 1, 1994

[54] METHOD OF SEAM LOCATION USING VACUUM

[75] Inventors: Richard J. Crayne, Saline; Gregory E. DeView, Ypsilanti, both of Mich.

[73] Assignee: Hoover Universal, Inc., Plymouth, Mich.

[21] Appl. No.: 898,417

[22] Filed: Jun. 15, 1992

[51] Int. Cl.$^5$ .................................................. A47C 7/02
[52] U.S. Cl. .......................... 297/452.61; 297/452.62; 29/91.1
[58] Field of Search ............ 297/452, 458, 219, 452.1, 297/452.13, 219.1, 452.61, 452.62, 452.68; 29/91.1, 91; 5/402, 406, 407, 474

[56] References Cited

U.S. PATENT DOCUMENTS

| | | | |
|---|---|---|---|
| 3,281,185 | 10/1966 | Albinson et al. | 297/452 |
| 3,341,251 | 9/1967 | Costin | 297/452 |
| 4,747,638 | 5/1988 | Saito | 297/452 X |
| 4,765,045 | 8/1988 | Selbert et al. | |
| 4,833,741 | 5/1989 | Mizuno et al. | 297/452.62 X |
| 4,852,228 | 8/1989 | Zeilinger | 29/91.1 |
| 4,867,508 | 9/1989 | Urai | 297/452 |
| 4,874,448 | 10/1989 | Urai | 29/91.1 X |
| 4,925,513 | 5/1990 | Witzke et al. | 297/452 X |
| 5,013,090 | 5/1991 | Matsuura | 297/452.61 |
| 5,016,941 | 5/1991 | Yokota | 297/219 X |
| 5,107,576 | 4/1992 | Rohn | 29/91.1 |

FOREIGN PATENT DOCUMENTS

| | | | |
|---|---|---|---|
| 1170743 | 11/1969 | United Kingdom | 297/452 |
| 8606709 | 11/1986 | World Int. Prop. O. | 297/452 |

*Primary Examiner*—Peter M. Cuomo
*Assistant Examiner*—Jerry Redman
*Attorney, Agent, or Firm*—Harness, Dickey & Pierce

[57] ABSTRACT

A method of seam location using a vacuum in which a laminate structure is formed having a cover member with a backing material bonded thereto. The cover member is comprised of multiple pieces joined together forming seams which are bound by a non-permeable binding. The cover member is placed on a holding tool and held in place by a vacuum applied to the area of the seams whereby the non-permeable binding is drawn against the holding tool, holding the cover member in place while a backing material is bonded thereto.

8 Claims, 2 Drawing Sheets

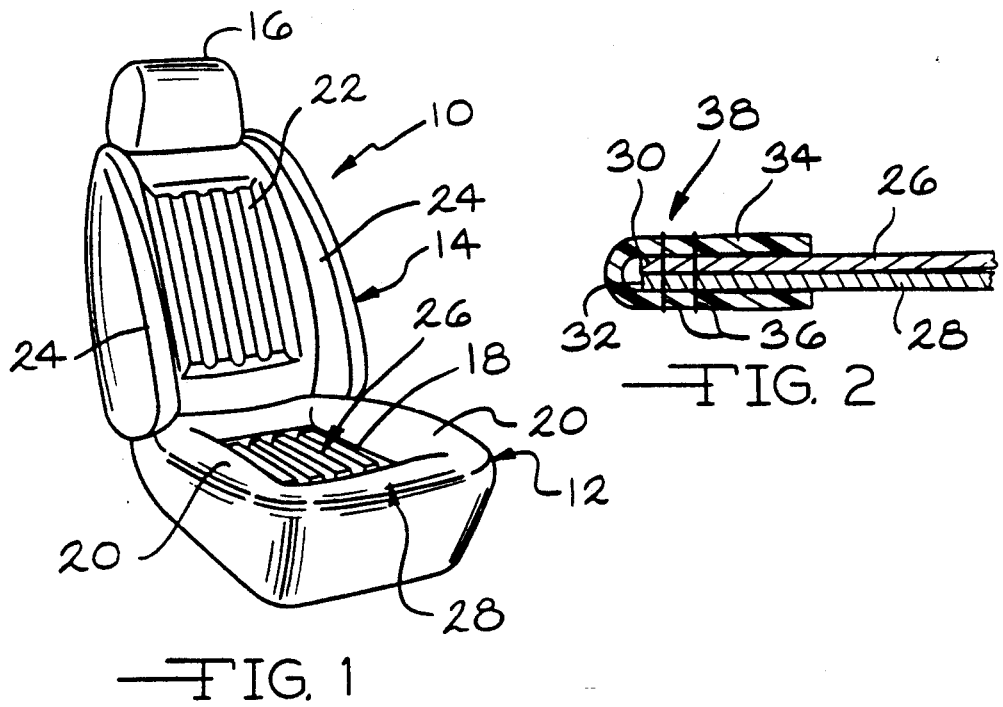
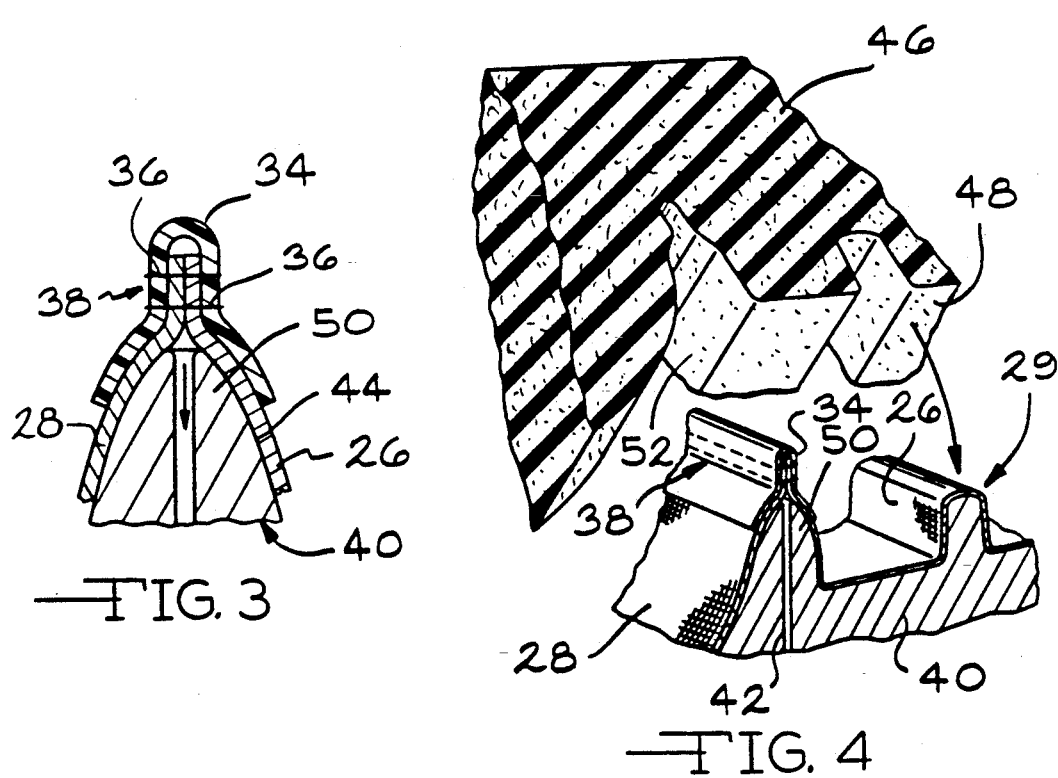

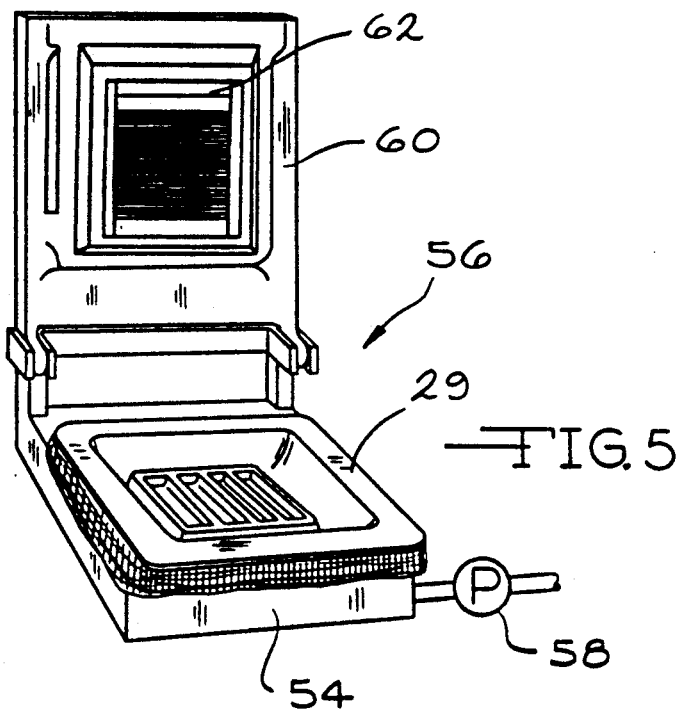
FIG. 5
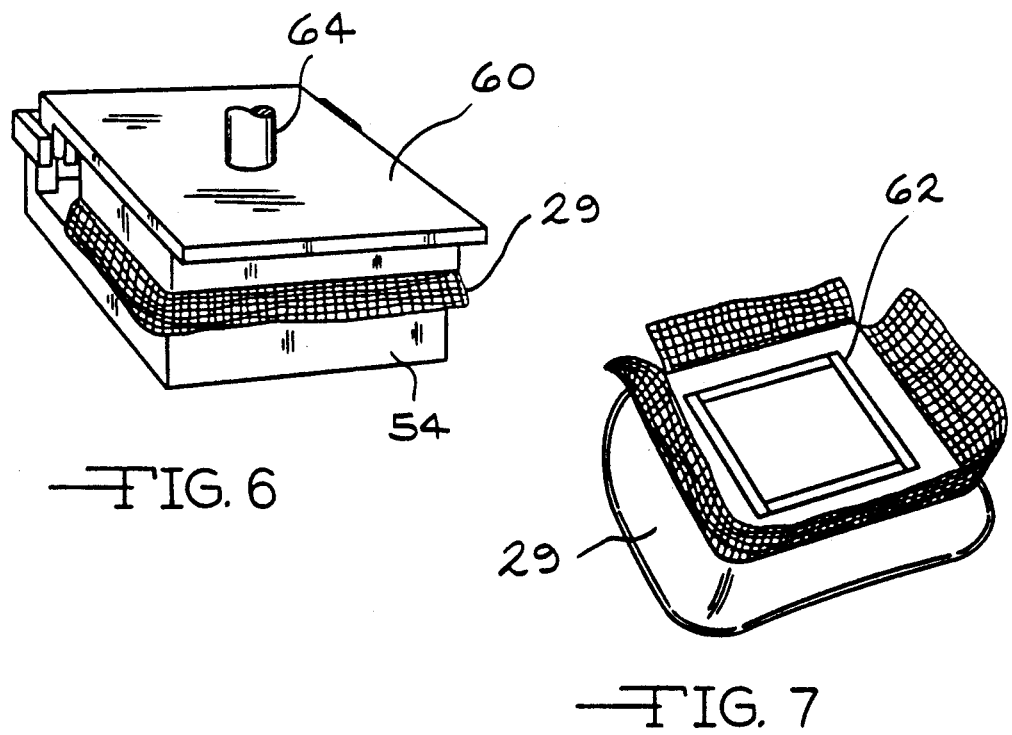
FIG. 6
FIG. 7

METHOD OF SEAM LOCATION USING VACUUM

BACKGROUND AND SUMMARY OF THE INVENTION

The present invention relates to a method for locating a seam in a cover member when applying a backing material thereto to align the cover member with the backing material and in particular to a method in which vacuum is used to locate the cover member seam.

When manufacturing a multiple layer laminate structure such as a vehicle door trim panel or a vehicle seat upholstery cover having a cover member with a backing material such as a foam pad bonded thereto, it is necessary that the cover material and the backing material be properly aligned with one another when they are bonded together. One method of aligning the cover member with a backing material is disclosed in U.S. Pat. No. 4,765,045 in which a trim strip is attached to the cover member at the seams between adjacent pieces of the cover member. The trim strip is held within grooves in a shaping tool to properly position the cover member when a foam pad is bonded thereto. Disadvantages of using a trim strip include the additional labor required to tear off the trim strip after the article has been completed and the creation of scrap from the torn off trim strip.

Accordingly, it is an object of the present invention to provide a method for properly aligning the cover member with the backing material when attaching the cover member to a backing material that reduces the labor required to produce a finished article and also eliminates the creation of scrap from the process.

The method of the present invention uses a vacuum to locate the cover member as opposed to the mechanical locating means of the trim strip. When two adjacent pieces of the cover member are sewn together, the sewn seam is bound with a nonpermeable binding strip. The cover member is then placed onto a holding tool that includes a vacuum channel at the desired location for the seam in the cover member. Once the cover member is placed on the surface of the holding tool, vacuum is applied to the vacuum channel, drawing the nonpermeable binding firmly against the tool to hold the cover member in place. With the cover member properly positioned, a foam pad or other backing material is accurately bonded to the cover member. Alternatively, a pour-in-place foaming process can be used to mold a foam pad to the properly positioned cover member. There is no need for any additional labor to remove a tear-off trim strip to complete the article.

Further objects, features and advantages of the invention will become apparent from a consideration of the following description and the appended claims when taken in connection with the accompanying drawings.

BRIEF DESCRIPTION OF THE DRAWINGS

FIG. 1 is a perspective view of a vehicle seat assembly having upholstery covers for the seat cushion and seat back manufactured according to the method of the present invention;

FIG. 2 is a fragmentary sectional view of a seam joining adjacent pieces of the cover member according to the present invention;

FIG. 3 is an enlarged sectional view showing the cover member of FIG. 2 being properly positioned on a holding tool;

FIG. 4 is a sectional view illustrating the application of a foam pad to the properly positioned cover member;

FIGS. 5 and 6 are perspective views of a holding tool and pour-in-place mold used to form a foam pad on the properly positioned cover member; and FIG. 7 is a bottom perspective view of a completed seat cushion manufactured according to the present invention using a pour-in-place foam pad.

DETAILED DESCRIPTION OF THE DRAWINGS

The seat assembly 10 shown in FIG. 1 is manufactured according to the present invention of locating the cover member seams with vacuum when applying the foam pad to the cover member. Seat assembly 10 includes a seat cushion 12 and a seat back 14 extending upwardly from the rear of the seat cushion. A headrest 16 extends from the upper end of the seat back. The seat cushion 12 and seat back 14 are each formed with a frame (not shown) covered by an upholstery cover comprising a foam pad and a cover member. The foam pad and cover member are bonded together forming a multiple layer laminate structure that is placed over the seat frame or has the frame embedded therein.

The seat cushion 12 is configured to form a central seating portion 18 surrounded by a raised bolster 20 on the sides and front of the seat cushion. The seat back is configured with a central portion 22 with upright bolsters 24 on each side thereof.

For ease of manufacture and for styling the cover member is often assembled from multiple pieces of material sewn together with seam. The central seating portion of the cover member may be a different material than the bolsters whereby a seam is formed therebetween. A seam 38 is shown in FIG. 2 between the cover member piece 26 used to cover the center portion 18 of the seat cushion and the cover member piece 28 used to cover the bolster. The two pieces of the cover member are positioned face to face with the edges 30 and 32 placed next to one another. A nonpermeable binding 34 is placed over the edges of the cover material and is sewn thereto by two rows of stitching 36 used to join the two pieces together forming the seam 38. The cover member 29 may include seams other than seam 38 between the central portion and the bolster portion.

Once the individual pieces are sewn together forming the completed cover member 29, the cover member is placed on a holding tool 40 shown in FIGS. 3 and 4 to hold the cover member in the desired location for proper alignment of the cover member with the backing material. The holding tool has a longitudinal vacuum channel 42 extending into the forming tool body from the tool surface 44. The cover member 29 is placed on the forming tool surface with the binding 34 and seam 38 placed over the vacuum channel 42. The tool surface 44 is complementary to the desired surface shape of the seat cushion or seat back.

Once the cover member 29 is placed on the forming tool, the air within the channel 42 is drawn out, forming a vacuum within the channel. The binding 34, being nonpermeable to air, is drawn down against the tool surface and holds the cover member in place thereon. With the vacuum maintained, a tacking material, such as a foam pad 46, having the desired contoured surface 48 for the seat cushion or seat back, is applied to the contoured surface 48 with an appropriate adhesive at the interface between the pad and cover member, thus bonding the foam pad thereto. The cover member and foam pad are held in place until the adhesive is sufficiently cured to retain the cover member on the pad.

In the preferred embodiment shown, the holding tool is formed with an upstanding ridge 50 throughwhich the vacuum channel 42 extends. The ridge then forms a corresponding depression or recess in the seat cushion or seat back shown by the recess 52 in the foam pad 46. The upstanding ridge 50 aids in aligning the seam 38 on top of the vacuum channel when the cover member is placed on the tool.

In place of a molded foam pad 46, the backing material for the seat cushion or seat back can be a poured in place foam as shown in FIGS. 5, 6 and 7. In a pour-in-place method, the holding tool is one half 54 of a mold 56. The mold half 54 includes the vacuum channels as shown with the holding tool 40 in FIG. 4 to hold the cover member 29 against the surface of the mold half. Vacuum pump 58 in communication with the vacuum channels is used to produce the vacuum. The other mold half 60 supports a seat cushion frame 62 which is lowered into the mold cavity when the mold half 60 is closed upon the mold half 54. Once closed, a foaming agent is poured into the mold cavity through the opening 64, filling the mold cavity with a foam that cures and bonds to the cover member 29 with the seat cushion frame 62 being partially imbedded in the foam pad. The end result is a laminate structure of a cover member and a foam pad bonded thereto. A frame may or may not be embedded in the foam, depending on the product being produced.

While the invention has been described in the context of forming a laminate upholstery cover for a seat assembly, the invention can also be used to produce other laminated structures including door trim panels, dash boards etc. having a cover member with a foam pad or other backing material bonded thereto. Vacuum is used to position and hold the cover member in place while the backing material is bonded thereto. With this method, the need for removing a trim strip as disclosed in the referenced U.S. patent is eliminated, reducing the labor required and avoiding the production of scrap material.

It is to be understood that the invention is not limited to the exact construction and method illustrated and described above, but that various changes and modifications may be made without departing from the spirit and scope of the invention as defined in the following claims.

We claim:

1. A method of making a laminate structure of a cover member and a backing material wherein said backing material includes first and second surface sections to be covered by said cover member, said method comprising the steps of:
    forming a first cover member section of a size to lie flat against said first surface section of said backing material, said first cover member section having a first edge;
    forming a second cover member section of a size to lie flat against said second surface section of said backing material, said second cover member section having a second edge;
    joining said cover member sections together along said edges forming a cover member with seams at said edges where said cover member sections are joined together;
    binding said edges at said seams with a non-permeable binding;
    positioning said cover member on a surface of a holding tool having a shape complementary to a desired shape for said laminate structure, said tool having a longitudinally vacuum channel extending along a desired position for said seams whereby when said cover member is placed on said tool, said non-permeable binding material overlies said vacuum channel;
    applying a vacuum to said vacuum channel whereby said non-permeable binding material is drawn toward said tool to hold said cover member at a position in which said cover member can be accurately aligned with said backing material;
    adhering said cover member to said backing material to form said laminate structure; and
    removing said laminate structure from said tool.

2. The method of claim 1 wherein said holding tool is formed with upstanding ridge surrounding said vacuum channel whereby said binding is placed over said ridge to position said cover member on said holding tool.

3. The method of claim 1 wherein said backing material is a foam pad and said laminate structure is an upholstery cover for a seat assembly.

4. The method of claim 1 comprising applying adhesive to the interface between said cover member and said backing material to adhere said backing material to said cover member.

5. The method of claim 1 wherein said backing material is a foam pad and said adhering step is carried out by molding said foam pad in a mold cavity comprised in part by said holding tool with said cover member held thereon whereby said foam is bonded to said cover member.

6. The method of making an upholstery cover for a seat including a cover member and a foam pad, said foam pad having first and second surface sections, said method comprising the steps of:
    forming a first cover member section of a size to lie flat against said first surface section of said foam pad, said first cover member section having a first edge;
    forming a second cover member section of a size to lie flat against a second surface section of said foam pad, said second cover member section having a second edge;
    joining said first and second cover member sections together along said edges forming said cover member with a seam between said cover member sections;
    binding said edges at said seam with a non-permeable binding;
    positioning said cover member on a surface of a holding tool having a shape complementary to a desired shape for said upholstery cover, said tool having a longitudinal vacuum channel extending along a desired position for said seam whereby when said cover member is placed on said tool said non-permeable binding overlies said vacuum channel;
    applying a vacuum to said vacuum channel whereby said non-permeable binding is drawn against said tool to hold said cover member at a position in which said cover member can be accurately aligned with said foam pad;
    adhering said cover member to said foam pad to form said upholstery cover; and
    removing said upholstery cover from said tool.

7. The method claim 6 wherein said holding tool includes an upstanding ridge surrounding said vacuum channel, said non-permeable binding overlying said vacuum channel and a portion of said ridge on opposite sides of said vacuum channel when said cover member is positioned on said holding tool.

8. An upholstery cover for a seat comprising:
a foam pad having first and second surface sections;
a first cover section having an inside surface and an outside surface and being of a size to lie flat against said first surface section of said foam pad with said inside surface contacting said foam pad and, said first cover section having a first edge;
a second cover section having an inside surface and an outside surface and being of a size to lie flat against said second surface section of said foam pad with said inside surface contacting said foam pad and, said second cover section having a second edge;
a seam for joining said first and second cover sections together along said edges with said outside surfaces of said cover sections engaging one another thereby forming a cover;
a flexible nonpermeable binding cover and engaging said inside surfaces of said first and second cover sections along said edges at said seam and being secured to said first and second cover sections by said seam; and
said cover member being bonded to said foam pad to cover said first and second surface sections.

* * * * *